United States Patent

[11] 3,586,152

| [72] | Inventors | George E. Austin<br>Mercer Island;<br>Robert H. Shannon, Seattle, both of, Wash. |
|---|---|---|
| [21] | Appl. No | 801,592 |
| [22] | Filed | Feb. 24, 1969 |
| [45] | Patented | June 22, 1971 |
| [73] | Assignee | FMC Corporation<br>San Jose, Calif. |

[54] STACKING AND UNSTACKING MAGNETIZABLE MATERIAL
4 Claims, 6 Drawing Figs.

[52] U.S. Cl............................................... 198/36,
198/41, 214/10, 198/45, 198/186
[51] Int. Cl................................................ B65g 65/28
[50] Field of Search.......................................... 198/36, 41,
45, 186, 98, 101, 88; 214/10

[56] References Cited
UNITED STATES PATENTS
1,310,454   7/1919   Stuart............................ 198/36

| 1,706,203 | 3/1929 | Allen.......................... | 198/49 X |
| 2,625,001 | 1/1953 | Heun........................... | 198/45 X |
| 3,232,408 | 2/1966 | Asbury........................ | 198/41 X |
| 3,314,525 | 4/1967 | Krause et al. ............... | 198/36 |
| 3,402,804 | 9/1968 | Elich........................... | 198/41 |

Primary Examiner—Albert J. Makay
Attorneys—F. W. Anderson and C. E. Tripp

ABSTRACT: A stacking and unstacking apparatus movable along a transport conveyor transfers incoming scrap to a belt conveyor mounted on a swingable boom for discharge into large stockpiles on either side along the transport conveyor. A magnetic pulley on the outer end of the boom attracts the scrap from the stockpile to the boom belt conveyor during unstacking. Transfer chuting is employed to direct the incoming scrap to the boom conveyor during stacking and receives scrap from the boom conveyor during unstacking. The chuting is also employed to combine the incoming scrap with the scrap being unstacked and deposits the combined scrap on the transfer conveyor for movement to a loading area.

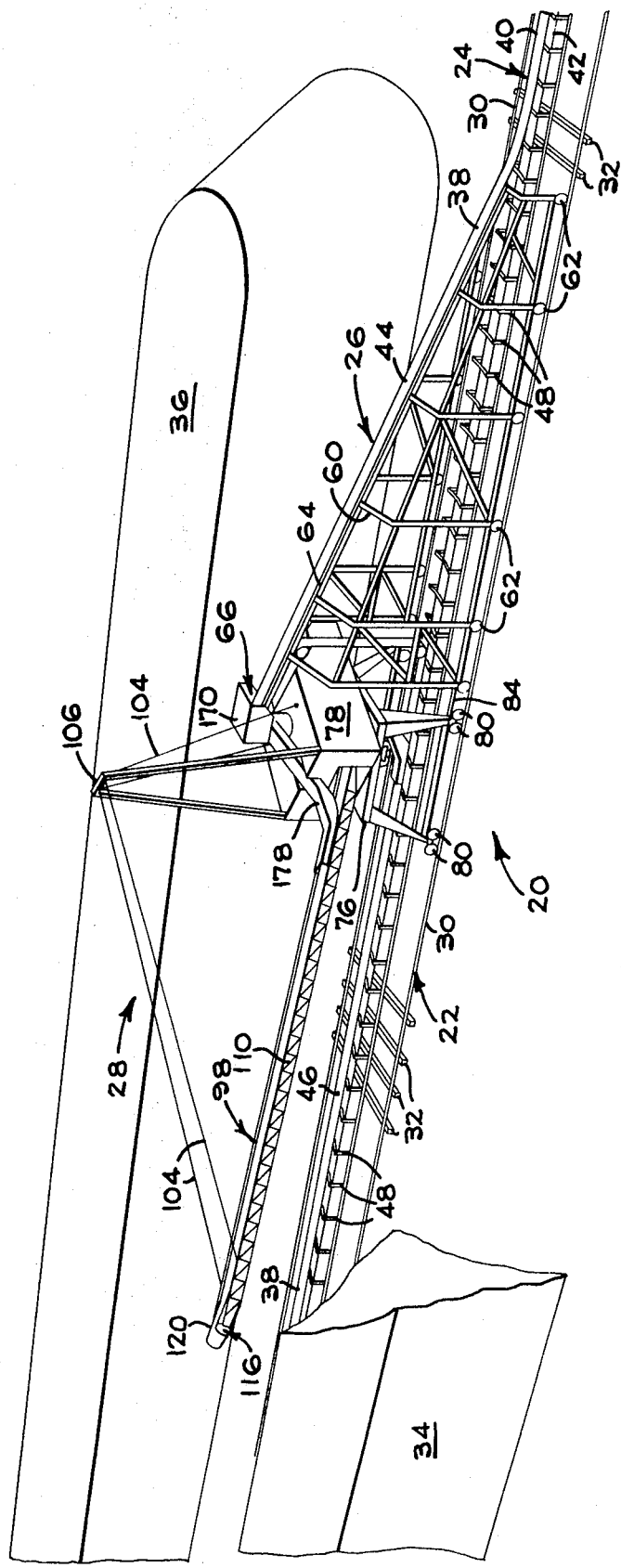
FIG_1
INVENTORS
GEORGE E. AUSTIN
ROBERT H. SHANNON
BY F. W. Anderson
C. E. Tripp
ATTORNEYS

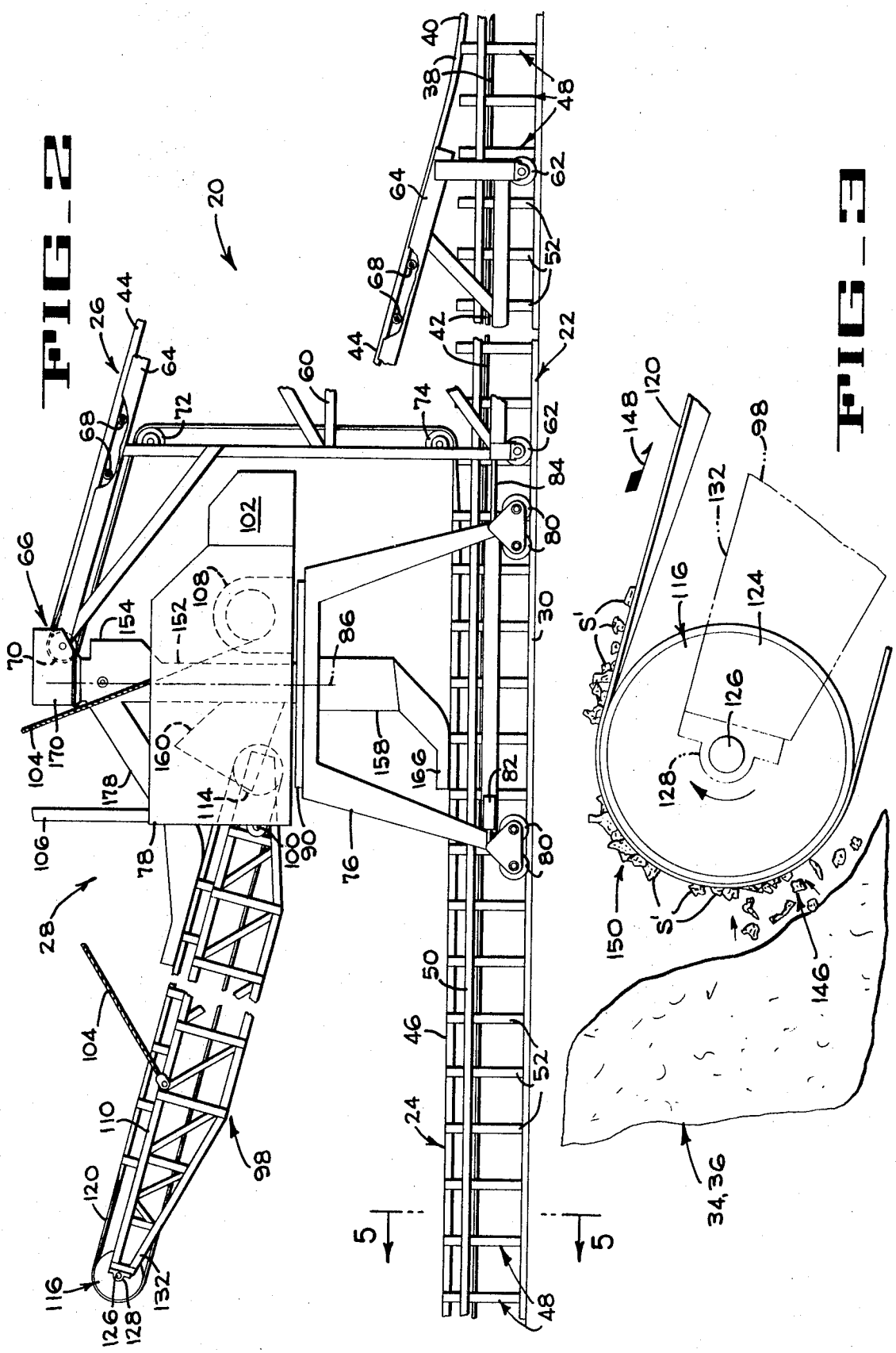

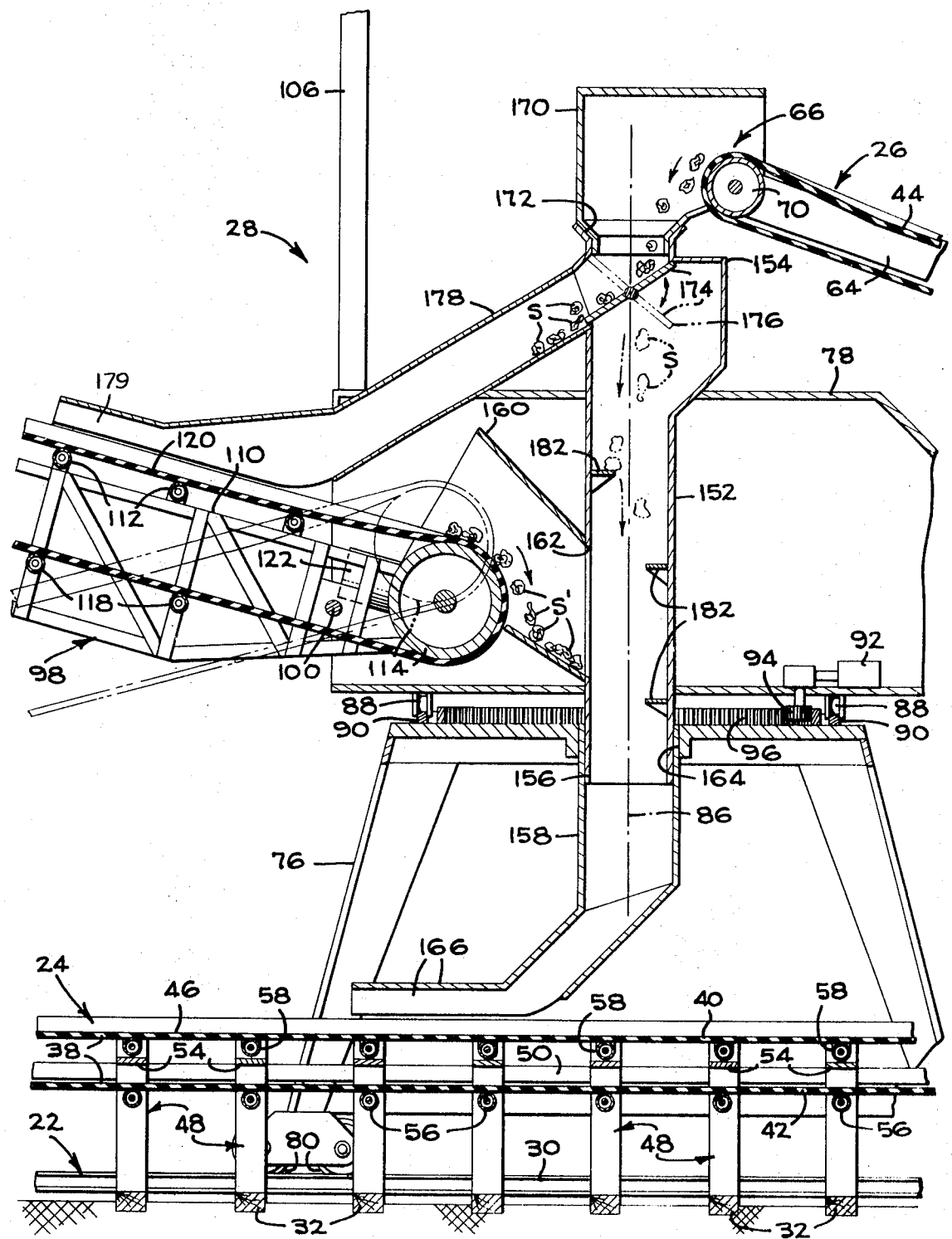
FIG_4

STACKING AND UNSTACKING MAGNETIZABLE MATERIAL

BACKGROUND OF THE INVENTION

1. Field of the Invention

The present invention relates to bulk material handling and in particular to a multimodal stacking and unstacking system for magnetically attractable material and will be described in connection with the handling of shredded metal.

2. Description of the Prior Art

One of the most common methods of reducing old automobile bodies and large appliances to reusable ferrous scrap in a denser form for shipment, is to shred them into generally fist sized pieces and remove the nonferrous material such as cloth and insulation. This operation is accomplished by large shredding machines commonly in use in the scrap metals industry. To be economically practical, the shredder must be operated on a continuous basis whether or not there is a requirement for shipment of the shredded scrap. Therefore, the shredded scrap must be stacked into large stockpiles for storage and later unstacked and moved to a loading point for shipment.

Generally, the scrap is conveyed to the stockpiling area and discharged into a stack. From there it is spread and formed into large stockpiles by bulldozers. In forming the stockpiles, the bulldozers tend to compact and entangle the scrap making it difficult to remove. An additional disadvantage is the low rate at which the scrap is moved, usually necessitating the use of several bulldozers to handle the output of the shredder.

Cranes with electromagnets are generally employed to transfer scrap from the stock into gondolas for rail shipment or movement to a docksite for loading into ships. The cranes also have disadvantages in that their rate of transfer is also relatively low (80—90 tons per hr.) under optimum conditions where only a short boom swing is necessary. If the crane itself must be moved between the stockpile and gondola the transfer rate is so low that this method cannot be employed.

Until the present time, no rapid method of handling large quantities of shredded scrap metal at low cost has been developed. Currently handling methods cost approximately one dollar per ton for each handling operation, which is quite expensive considering that the selling price of No. 2 bundle scrap is approximately 20 to 25 dollars per ton.

In addition, demurrage charges and layover time of ships and rail cars further increases the transportation and handling costs of the scrap metals industry and their customers due to the low rates at which the scrap is unstacked from the stockpiles and transported to the loading area.

SUMMARY OF THE INVENTION

The purpose of the present invention is to solve the long existing problem of economically handling large quantities of shredded scrap metal encountered by the scrap metal industry. In particular, one object of the invention is to provide a means of continuously stacking scrap in large stockpiles without undue compaction. A mobile stacker-unstacker having a belt conveyor mounted on a movable boom receives incoming scrap from a transport conveyor and transfers the scrap to the boom belt conveyor which discharges the scrap from the end of the boom directly into stockpiles on either side of the transport conveyor. As the stacker-unstacker is moved along the transport conveyor the stockpile can be extended to any desired length without further handling of the scrap.

Another object of the invention is to continuously unstack scrap from the stockpiles at a rate preferably in excess of 400 tons per hour, to enable rapid loading of ships and rail cars. During unstacking the boom belt conveyor is operated in the reverse direction and the outer end of the boom is placed in close proximity with the stockpile. The stacked scrap is magnetically attracted from the stockpile to the boom belt conveyor and transferred to the transport conveyor to be carried to a loading area.

A further object of the invention is to provide a means for combining scrap being unstacked with incoming scrap to the stacker-unstacker into a continuous combined flow on the outbound section of the transport conveyor to deliver scrap to the loading area at a maximum rate.

BRIEF DESCRIPTION OF THE DRAWINGS

FIG. 1 is a diagrammatic perspective view of a stacking and unstacking system embodying the present invention.

FIG. 2 is a diagrammatic side view having portions broken out, in which the stacker-unstacker is positioned with the boom elevated and rotated forwardly.

FIG. 3 is a schematic view of the foot pulley illustrating the manner in which scrap is unstacked.

FIG. 4 is an enlarged diagrammatic fragmentary central section of the stacker-unstacker showing the transfer and combining mechanism as well as the associated conveyors.

DESCRIPTION OF THE INVENTION

Figure 5:
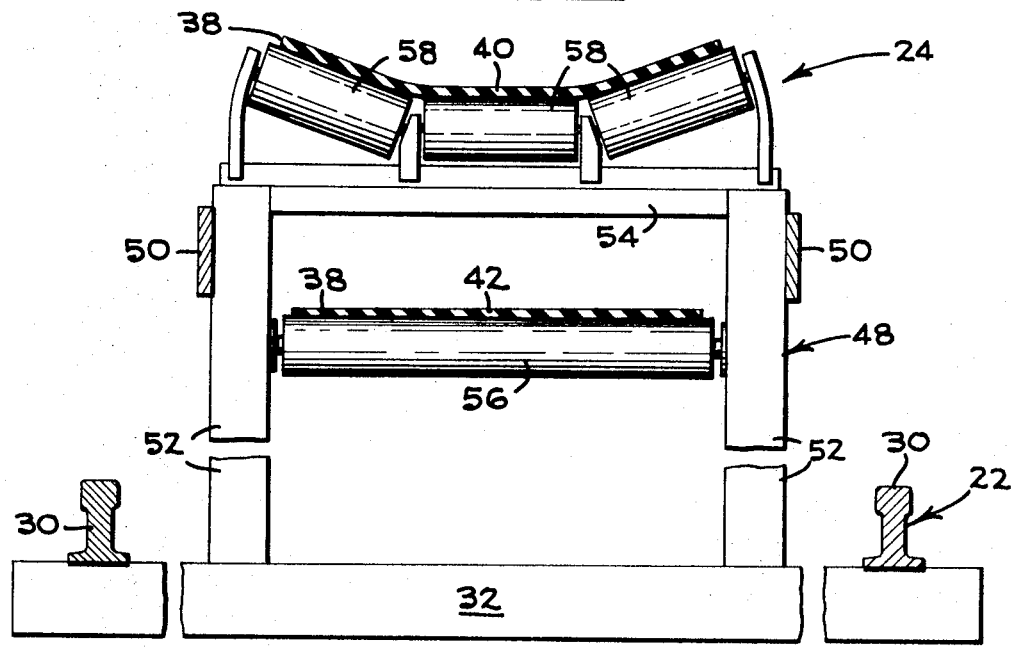
FIG. 5 is a typical cross section of the transport conveyor taken on line 5–5 of FIG. 2.

A stacking and unstacking system 20 incorporating the present invention, is shown in FIG. 1. The system 20 includes a rail road track 22, a transport conveyor 24, a tripper 26 and a combination stacker-unstacker apparatus 28.

The track 22 is constructed in the conventional manner including rails 30 and ties 32 and is located between stockpiles 34 and 36. The transport conveyor 24 shown in FIGS. 1 and 2 is of a well known endless belt type commonly employed in transporting bulk material, and includes conventional drives and takeups which are not shown. The transport conveyor 24 is effective to carry incoming shredded scrap metal S from a shredding apparatus, (not shown) such as commonly employed in scraping of automobile bodies, between the stockpile 34, 36 and continues on to a loading area, also not shown. As seen in FIGS. 1 and 2 the conveyor 24 includes an endless belt 38 having an upper carrying belt section 40 and a lower return section 42. The section of the upper belt 40 between the source and the stacker-unstacker 28 will be referred to as the inbound section 44, and the remaining portion of the belt between the stacker-unstacker and the unloading area will be referred to as the outbound section 46 which functions as a discharge conveyor. In the vicinity of the stockpiling area, the conveyor belt 38 is supported by multiple support frames 48 which are interconnected by longitudinal braces 50. A typical support frame 48, shown in FIG. 5, is mounted on one of the ties 32 between the rails 30. The frame is comprised of laterally spaced vertical uprights 52 which support a horizontal crosspiece 54 and a return idler roller 56 that supports the lower return belt section 42 in a flat position. Multiple load-carrying idler rollers 58 are mounted on the horizontal crosspiece 54 and support the load-carrying belt section 40 in a trough profile.

Referring to FIGS. 1 and 2, a mobile belt elevating structure 26, usually referred to as the tripper carriage, which serves as a delivery conveyor is shown located behind the stacker-unstacker 28. The tripper 26 is comprised of an open framework 60 that straddles the transport conveyor 24 and is supported on either side thereof by multiple wheels 62 for movement along the rails 30. The upper portion of the framework 60 forms an inclined (FIG. 2) 64 that extends upwardly from above the conveyor frames 48 to a delivery point 66 above the stacker-unstacker 28. Multiple load-carrying rollers 68 are mounted along the slope 64 (FIG. 2) in a manner similar to which the load-carrying rollers 58 are mounted on the conveyor frames 48 (FIG. 5).

As seen in FIG. 2, the inbound belt section 44 is lifted from the conveyor frames 48 and supported along the slope 64 until reaching its upper end where the belt section 44 is trained around a discharge pulley 70 located at the top of the framework 60. The belt is then directed rearwardly and then downwardly to the rollers 58 on the conveyor frame 48 by return idler pulleys 72 and 74 and continues onward to the (FIG. 2) loading area (not shown) as the outbound section 46. The tripper 26, constructed in the aforedescribed manner, can be moved along the track 22 as desired to provide an elevated scrap delivery to the stacker-unstacker.

The combination stacker-unstacker 28 (FIG. 2) is basically a modified form of a commonly known gantry employed in shipyards. It is comprised of a four-legged base frame 76 and a rotating cab or support structure 78, which, as will be described hereinafter, defines a mixing compartment for material handled by the system. The frame 76 also straddles the conveyor and is supported on the rails 30 by multiple wheels 80. Commonly known multiple electric motor and reduction gear box units 82 are coupled to the wheels 80 to move the frame 76 along the rails 30. The tripper and stacker-unstacker frames are interconnected by tow bars 84 for simultaneous movement along the track 22.

The support structure 78 (FIG. 4) is mounted on the frame 76 for rotational movement about a vertical axis 86 by means of multiple rollers 88 beneath the structure which run on a circular rail 90 on the base frame. An electric motor and gear reduction unit 92 on the structure 78 drives a pinion 94 which meshes with a bull gear 96 on the frame 76 to rotate the support structure 78. The support structure (FIG. 2) further includes a boom 98, that is pivotally mounted on the front of the cab at 100 for movement in a vertical arc, and a counterweight 102 at the rear of the support structure 78 to balance the structure and boom. The boom 98 is elevated between raised and lowered positions by a conventional topping lift comprised of cable rigging 104 reeved over a king post 106 to a topping winch 108.

A conveyor frame 110 is supported by the boom 98 and includes multiple load-carrying idler rollers 112, such as described in connection with the transport conveyor 24. The boom additionally supports a head pulley 114 on its inner end and a magnetic foot pulley 116 on its outer end as well as multiple return idler rollers 118 (FIG. 4) suitably spaced along its length. An endless conveyor belt 120 trained around the pulleys 114 and 116, is supported by rollers 112 and 118, and is driven by the head pulley 114 through a variable speed reversible motor and gear box unit 122. The conveyor belt 120 functions as a discharge conveyor which may be selectively driven in either direction to convey the scrap to and from the support structure 78.

Figure 6:
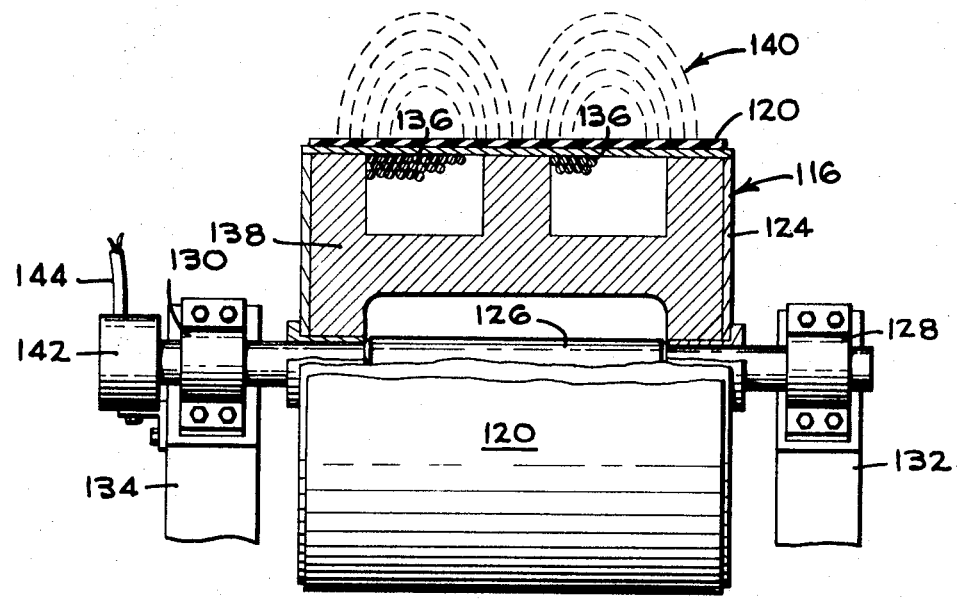
FIG. 6 is a diagrammatic front view of the magnetic foot pulley, portions thereof being broken away.

The magnetic foot pulley mounting and construction is shown in FIG. 6. The magnetic pulley 116 is generally comprised of a cylindrical drum 124 that is rigidly mounted on a shaft 126 which in turn is rotatably supported in a pair of pillow blocks 128 and 130. The pillow blocks are mounted on a pair of vertical support members 132 and 134 located on the end of boom so that the pulley 116 projects outwardly from the end of the boom (FIG. 2).

Multiple circular coil windings 136, seen in the broken away portion of FIG. 6, are formed of layer-wound copper magnet wire and are supported adjacent the face of the drum 124 by means of a casing 138. The windings extend around the entire inner periphery of the drum and produce a magnetic field as indicated at 140. In order to provide a rotary connection for current to energize the magnetic pulley 116, a collector ring assembly 142 is mounted on the end of the shaft 126 and attached to the vertical support member 134. Direct current from suitable source, which may be located in the stacker-unstacker 28 or exterior thereto, is supplied to the collector ring assembly 142 through a cable 144 and is transmitted to the coil windings 136 by means of connections, not shown, internal of the shaft 126.

During unstacking, the magnetic foot pulley 116 is energized and placed in close proximity to one of the stockpiles 34 or 36 as seen in FIG. 3. The scrap in the stockpile is magnetically attracted toward the magnetic pulley 116 in the area generally designated at 146. When the upper run of the conveyor belt 120 is driven inwardly toward the support structure 78 as indicated by arrow 148, the unstacked scrap S' is retained against the belt 120 by the magnetic field generated by the pulley 116 so that the scrap S' is carried upwardly over the pulley 116 as at 150, until the belt alone supports the scrap S'.

The stacker-unstacker (FIG. 4) further includes a vertical transfer chute 152 which is rigidly mounted in the rotating support structure 78 and centered on its axis of rotation 86. The chute has an upper portion 154 which extends above the structure 78 and a lower portion 156 which is rotatably received in a discharge nozzle 158. The transfer chute 152 includes a guide chute 160 which is mounted thereon and positioned to receive unstacked scrap S' discharged from the head pulley 114 on the inner end of the boom 98. The guide chute 160 conveys unstacked scrap S' through an opening 162 in the side of the transfer chute 152. The scrap S' discharged from the boom 98 continues downward through the transfer chute 152 and through the discharge nozzle 158 where it is deposited on the outbound upper load-carrying belt section 46 of the transport conveyor 24 which functions as a discharge conveyor. The discharge nozzle 158 is rigidly mounted in the base frame 76 in an aperture 164. The nozzle 158 further includes skirts 166 which confine and level the scrap discharged from the nozzle in the conveyor 24.

A covered hopper 170 (FIG. 4) is employed at the upper end of the chute to confine and guide the incoming scrap from the tripper carriage 26 into the transfer chute 152. The hopper 170 is mounted on the inclined framework 64 of the tripper 26 at the discharge pulley 70 and is rotatably received in a flared circular opening 172 at the top of the transfer chute 152 centered on the vertical axis 86. A diversion gate 174 is mounted in the upper portion of the transfer chute 152 and is moved to and retained in either a load position as shown, or a transfer position 176 indicated in phantom line by a conventional hydraulic or mechanical actuating mechanism not illustrated. In the load position, the diversion gate is effective to direct the incoming flow of scrap S from the transfer chute 152 into a loading chute 178. The loading chute 178 which directs the incoming scrap onto the boom belt conveyor 120, is rigidly attached to the support structure 78 and the transfer chute 152. The loading chute 178 has an upwardly inclined portion 179 that directs the scrap to be stacked onto the boom conveyor 120 when the boom is in the raised position. When the diversion gate is moved to and retained in the transfer position 176, the incoming scrap from the tripper 26 is directed into the transfer chute 152 and falls downwardly therethrough under the force of gravity. Baffles 182 arranged on opposing sides of the transfer chute serve to break the fall and reduce the velocity of the scrap as it passes through the transfer chute reducing wear on the conveyor belt 38 and discharge nozzle 158.

Operation

The ferrous scrap metal stacking and unstacking system 20 can be selectively operated in the modes of stacking, unstacking, combining, and conveying to facilitate the transfer, storage and loading of scrap on a continuous basis.

Stacking Mode

A continuous supply of shredded ferrous scrap metal is transported to the stockpiling area on the inbound section 44 of the transfer conveyor 24. The scrap S is elevated by the tripper 26 and discharged into the covered hopper 170 mounted on the tripper framework 60. The hopper 170 continuously discharges the scrap into the transfer chute 152 mounted on the central vertical axis 86 of the stacker reclaimer 28. In the stacking mode, a diversion gate 174 mounted in the upper portion of the transfer chute 152 is positioned as shown in FIG. 4 so that the scrap discharged from the hopper into the transfer chute is directed into a loading chute 178. The scrap metal slides down the loading chute onto the boom belt conveyor 120. In this mode, the upper run of the belt 120 is driven in the outward direction by the variable speed reversible motor 122, and the scrap is discharged over the foot pulley 116 located on the outer end of the boom 98. The boom 98, which is pivotable in a vertical arc of approximately 15° either side of the horizontal, is preferably placed in the fully raised position during the stacking mode, as seen in FIG. 2. The support structure 78, which is rotatable on the circular rail 90 by the motor and gear reduction unit 92, is rotated to the desired position over either of the stockpiling areas 34 or 36. As the material is discharged over the foot pulley 116, the boom 98 and support structure 78 are oscillated horizontally to deposit the scrap metal in the stockpiling area. Simultaneously, the entire base frame 76 of the stacker-unstacker 28 can also be driven along the track 22 such that a stockpile is formed along either side of the track 22. The maximum height of the stockpile is limited by the length of the boom and the inclination at which the scrap can be supported on the conveyor belt without sliding back, which is approximately 15°, and therefore determined by the length of the boom originally selected. The length of the stockpile is practically unlimited except by the space available for the stockpiling area. Thus, by rotating the support structure and boom in a horizontal arc and moving the entire stacker-unstacker 28 along the track 22, stockpiles of various lengths can be produced on either side. It can also be seen that, as the stacker-unstacker 28 is moved along the rail, the tripper 26 which elevates the incoming belt section 44 moves along behind the stacker-unstacker 28 picking up the incoming belt section 44 in a different area, since the tripper 26 is connected to the base frame 76 of the stacker-unstacker by means of tow bars 84.

Unstacking Mode

In the unstacking mode no material is supplied by the inbound conveyor section 44 and hence the position of the diversion gate 174 is immaterial. The magnetic foot pulley 116 is now energized and lowered to the stockpile while the boom conveyor belt 120 is reversed in direction such that the material attracted to the foot pulley is conveyed back toward the support structure of the stacker-unstacker 28. In order to be effective, the foot pulley 116 must be maintained in close proximity of the stockpile 34. The foot pulley may be positioned at any point at which it is in close proximity to the stack, however, it is usually preferable to start at the top corner surface of the stockpile. As the material is picked up from the stockpile, the boom is alternately rotated in a horizontal arc or in a vertical arc such that the close proximity to the stockpile surface is maintained. As the stockpile area is reduced, the stacker-unstacker 28 is moved forwardly along the track 22 as required. The reclaimed scrap S' which is conveyed inwardly to the support structure is discharged over the head pulley 114 into a discharge area. A guide chute 160 is located in the discharge area and is effective to guide the material emanating from the end of the foot pulley into a side opening 162 of the transfer chute 152. The reclaimed scrap passes downwardly through the transfer chute 152 into the discharge nozzle 158 mounted on the base frame 76, from where it is discharged onto the outbound section of the upper conveyor belt of a transport conveyor 24 and is carried to an unloading point, now shown. Spreader skirts 166 mounted on the discharge nozzle are effective to spread and contain the scrap metal on the outbound conveyor section 46 preventing spillage of the scrap during conveyance to the unloading point.

Combining Mode

In the combining mode, the incoming scrap S is similarly supplied as in the stacking mode, however, the diversion gate 174 located in the upper portion of the transfer chute 152 must be placed in the transfer position 176 as shown in phantom line in FIG. 4. The incoming scrap S is discharged from the hopper into the transfer chute and deflected by the diversion gate 174 in the transfer position such that the scrap S falls downwardly through the transfer chute 152. Baffles 182 located along the sides of the transfer chute serve to break the fall of the falling scrap and reduce the wear on the discharge nozzle 158 and outbound belt section 46 located below. The stacker-unstacker 28 is simultaneously operated as in the unstacking mode, previously described, in which the scrap is magnetically attracted, the stockpile 34 and conveyed toward the support structure 78 by the boom conveyor 120. The unstacked scrap S' discharged from the foot pulley 114 on the inward end of the boom, is received in the discharge area by the guide chute 160 and is directed through the side opening 162 into the transfer chute 152 where it merges with the incoming scrap S. The incoming scrap S and unstacked scrap S' combine as they drop through the transfer chute 152 and discharge nozzle 158. The combined scrap is then carried to the unloading point by the outbound conveyor section 46.

Conveying Mode

A final mode of operation of the scrap handling system is the conveying mode. In this mode the stacker-unstacker 28 is essentially inoperative. However, the diversion gate 174 is placed in the transfer position as indicated at 176 (FIG. 4) thereby permitting the scrap to pass through the stacker-unstacker. This mode of operation permits use of the scrap handling system as a conveying system between the shredding apparatus and the unloading point while the stacker-unstacker is inactive and having the particular advantage that if the material is neither intended to be stacked, unstacked or combined, the apparatus must not be removed from the handling system to allow the use of the transport conveyor 24 as a normal conveyor.

Although the preceeding description is directed to a stacking and unstacking handling system for shredded scrap metal, it will be recognized that the system could equally as well be applied to the stacking and unstacking of other types of magnetically attractable material.

Although the best mode contemplated for carrying out the present invention has been herein shown and described, it will be apparent that modification and variation may be made without departing from what is regarded to be the subject matter of the invention.

We claim:

1. Apparatus for stacking and unstacking material of the type comprising a lower support structure, an upper structure supported by said lower structure and rotatable about a vertical axis, a boom supported intermediate its ends on said upper structure and tiltable in a vertical plane, a reversible endless conveyor on the boom, an endless transport conveyor passing beneath the upper structure and having a tripper section running to a discharge point above said upper structure; the improvement comprises a substantially vertical transfer chute extending through said upper and lower structures at said vertical axis between said tripper section discharge point and the transport conveyor beneath said upper structure, a loading chute communicating between the upper portion of said transfer chute and said boom conveyor, a guide chute leading into said transfer chute positioned to receive material discharged from the inner end of the boom conveyor and a diversion gate in said transfer chute for selectively directing material from the upper portion of said transfer chute to either the loading chute or the lower portion of said transfer chute.

2. The apparatus of claim 1 wherein said loading chute further comprises an upwardly inclined section to guide material onto the boom conveyor when the boom is in the elevated position.

3. The apparatus of claim 1 wherein said transfer chute, loading chute and guide chute rotate with the upper structure about said vertical axis.

4. The apparatus of claim 1 wherein said transfer chute communicates with a discharge chute mounted on the lower structure to convey material to the transport conveyor, said discharge chute further including spreader skirts to spread and contain the material deposited on the conveyor.

PO-1050
(5/69)

UNITED STATES PATENT OFFICE
CERTIFICATE OF CORRECTION

Patent No. 3,586,152      Dated June 22, 1971

Inventor(s) GEORGE E. AUSTIN and ROBERT H. SHANNON

It is certified that error appears in the above-identified patent and that said Letters Patent are hereby corrected as shown below:

```
Col. 2, line 68, delete "(Fig. 2)" and insert --section--
Col. 3, line  6, delete "(Fig. 2)" and insert --distant--
Col. 5, line 46, delete "of" and insert --to--
Col. 5, line 64, change "now" to --not--
Col. 6, line 9, after "attracted" insert --from--
Col. 6, line 9, delete the comma
```

Signed and sealed this 6th day of June 1972.

(SEAL)
Attest:

EDWARD M.FLETCHER,JR.      ROBERT GOTTSCHALK
Attesting Officer      Commissioner of Patents